(12) United States Patent
Kashiwagi

(10) Patent No.: US 7,969,597 B2
(45) Date of Patent: Jun. 28, 2011

(54) PRINTING SYSTEM THAT OUTPUTS A PHOTOGRAPHIC PRINT FROM ACQUIRED IMAGE DATA

(75) Inventor: Hisakazu Kashiwagi, Wakayama (JP)

(73) Assignee: Noritsu Koki Co.Ltd., Wakayama (JP)

( * ) Notice: Subject to any disclaimer, the term of this patent is extended or adjusted under 35 U.S.C. 154(b) by 957 days.

(21) Appl. No.: 11/451,090

(22) Filed: Jun. 12, 2006

(65) Prior Publication Data

US 2006/0285156 A1 Dec. 21, 2006

(30) Foreign Application Priority Data

Jun. 10, 2005 (JP) ................................ 2005-171094

(51) Int. Cl.
*G06F 3/12* (2006.01)
*G06K 15/00* (2006.01)
(52) U.S. Cl. ..................... 358/1.15; 358/1.12; 358/1.13; 358/1.14
(58) Field of Classification Search ........ 358/1.12–1.15, 358/402; 715/835; 396/2; 705/26, 40; 382/100
See application file for complete search history.

(56) References Cited

U.S. PATENT DOCUMENTS

| 5,706,457 | A  | * | 1/1998  | Dwyer et al. ................. 715/835 |
| 6,915,071 | B2 | * | 7/2005  | Maekawa et al. ................ 396/2 |
| 6,915,273 | B1 | * | 7/2005  | Parulski ........................... 705/26 |
| 6,950,198 | B1 | * | 9/2005  | Berarducci et al. .......... 358/1.12 |
| 7,161,694 | B2 | * | 1/2007  | Saka et al. .................... 358/1.13 |
| 7,327,478 | B2 |   | 2/2008  | Matsuda |
| 7,440,923 | B1 | * | 10/2008 | Compiano ...................... 705/44 |
| 7,558,401 | B2 | * | 7/2009  | Alasia et al. .................. 382/100 |
| 7,561,288 | B2 | * | 7/2009  | Yano et al. .................... 358/1.15 |
| 7,630,513 | B2 | * | 12/2009 | Alasia et al. .................. 382/100 |
| 2002/0036793 | A1 | * | 3/2002  | Roosen et al. ............... 358/1.15 |
| 2002/0122203 | A1 |   | 9/2002  | Matsuda |
| 2004/0001223 | A1 | * | 1/2004  | Tanaka ......................... 358/1.15 |
| 2004/0143549 | A1 | * | 7/2004  | Likourezos .................... 705/40 |
| 2005/0219640 | A1 | * | 10/2005 | Kasatani ....................... 358/402 |
| 2006/0103866 | A1 | * | 5/2006  | Saka et al. .................... 358/1.13 |

FOREIGN PATENT DOCUMENTS

| JP | 2001-245077 A  | 9/2001  |
| JP | 2002-359718 A1 | 5/2002  |
| JP | 2004-157845 A  | 6/2004  |
| JP | 2004-192219    | 7/2004  |
| JP | 2004-255817 A  | 9/2004  |
| JP | 2004-333625 A  | 11/2004 |

* cited by examiner

*Primary Examiner* — James A Thompson
*Assistant Examiner* — Satwant K Singh
(74) *Attorney, Agent, or Firm* — Fulbright & Jaworski L.L.P.

(57) ABSTRACT

A printing system comprises a processing unit provided in a printing portion B for performing print processing by transmitting image data acquired by a receiving terminal A to the printing portion B. The necessary present processing can be performed by logging on to the present system by inputting authentication information from a keyboard 12 and mouse 13 provided as an input terminal in the receiving terminal A to the processing unit 25 of the printing portion B. The print processing can be executed also when an operator is not logged in to the present system.

8 Claims, 7 Drawing Sheets

PRINTING SYSTEM THAT OUTPUTS A PHOTOGRAPHIC PRINT FROM ACQUIRED IMAGE DATA

BACKGROUND OF THE INVENTION

1. Field of the Invention

The present invention relates to a printing system provided with a processing unit that prints acquired image data on a print medium in a printing portion, and more specifically, relates to technology in which print processing in the printing portion is administered while eliminating inappropriate operation by an inexperienced operator.

2. Description of the Related Art

Technology similar to the printing system configured in the above manner is disclosed in JP 2004-192219A (Claim 1, paragraphs [0020] to [0026], FIG. 2). That is, in printer driver software of a print apparatus, a printer driver settings screen is displayed by selecting a menu provided by an application program that performs printing, and it is possible to judge whether each settings item related to the print operation is in a locked state or an unlocked state via this settings screen. Also, the setting of the locked state and the unlocked state is performed by an administrator, and when changing the content of an item in the locked state, it is necessary to enter a correct password.

Using a digital photograph print apparatus installed in a photo lab as an example, in photograph print processing that forms a shot image on print paper based on image data acquired from each frame of photographic film or image data acquired from media such as flash memory, prior to printing, the image data to be printed is selected, and pre-judging work in which order data such as print size and the number of prints are set is performed. Before beginning this pre-judging work, it is conceivable to authenticate the operator by asking for password input. However, a conventional print processing program that realizes print processing is executed after performing operator authentication by asking for password input and logging on, and when this print processing program is executed, various information can be acquired in the print processing. Accordingly, with a print processing unit essentially configured from a personal computer (referred to below as simply a processing unit), via the pre-judging work, after setting the image data to be printed and setting the order data (number of copies to print and print size), a logged-on state is maintained, and the program for print processing is continuously executed in this processing unit. Accordingly, in a conventional processing unit, in which a logged-on state is maintained while print processing is continued, the processing unit is in a state in which desired operating input is permitted, arid as a result a problem can occur in which erroneous information is set by an erroneous operation.

This type of erroneous operation often occurs under conditions in which the processing unit is operated by a plurality of operators, i.e., under conditions in which a photographic printing system that has been installed in a photo lab is operated by a plurality of inexperienced operators.

SUMMARY OF THE INVENTION

It is an object of the present invention to eliminate, as much as possible, inappropriate operation of a printing system in which a personal computer is used as a processing unit.

In accordance with an embodiment of the present invention, the printing system comprises a printing portion that forms an image on a printing medium based on image data, and a processing unit that administers photographic print output processing. The processing unit comprises a log on/log off administration portion that permits operation from an input terminal by an operator logging on when booting, and print administration means or module that directly administers the printing portion in a state in which log-on has not been established by the log on/log off administration portion.

The print administration means or module can administer the printing portion even in a state prior to logging on or after logging off. That is, even before a high-ranking operator logs on by inputting a proper password, before performing print processing it is possible to recognize a circumstance in which it is necessary to supply the printing medium in the printing portion, or in which the printing medium is jammed in the transport system and printing is not possible. Further, because administration of the printing portion is possible when logged off, for example, when continuing to print in the printing portion, or when print processing with the printing portion is finished, it is possible to administer the printing portion. As a result, normal print processing can be administered even in a logged-off state of the processing unit, and it is possible to eliminate problems in which an inexperienced operator performs an erroneous input operation by always maintaining the processing unit in a logged-on state.

In accordance with an embodiment of the present invention, the processing unit, by loading a plurality of programs including an administration program when booting, executes processing set in advance before logging on and when logged off, at which time operation from the input terminal is prohibited. The administration program, when it has determined that there was a problem in the execution of print processing with the printing portion, performs notification processing that notifies that there is a problem in the print processing. Thus, before logging on to the processing unit, and also in a situation when logged off, when a problem has occurred in the print processing in the printing portion such as bad transport of the printing medium, by the processing unit performing notification processing, the operator can promptly perform work such as solving the bad transport problem.

In accordance with an embodiment of the present invention, a print execution means or module executes print processing by the printing portion based on print data and order data even when the processing unit is in a logged-off state. Thus, even when the processing unit is in a logged-off state, not only is print processing possible in the printing portion, it is also possible to monitor and administer the printing portion while continuing this print processing.

In accordance with an embodiment of the present invention, the printing system comprises an integrated receiving terminal, which comprises a media drive for acquiring image data from the storage medium, a display for displaying processing information, an information input means that acquires operating information from an operator, and a terminal unit for controlling the media drive, the display and the information input means. The terminal unit of the receiving terminal and the processing unit are connected via a communications means. A sharing control portion displays information from the processing unit on the display. Information provided in the receiving terminal is transmitted to the processing unit via the communication means. With this configuration, along with being able to receive image data in the receiving terminal, information from the processing unit is displayed on the display of this receiving terminal. It is possible to set necessary information from the receiving terminal to the processing unit by transmitting information from the input terminal of the receiving terminal to the processing unit with the communications means.

The terminal unit comprises a receiving processing means for displaying a guidance screen on the display. By operating the information input means according to this guidance screen, the receiving processing means acquires image data from the storage medium via the media drive and acquires order data that is necessary for print processing. A mode switching means performs switching between a receiving mode in which information based on the processing of the receiving processing means is displayed on the display and a print administration mode that displays information based on the processing of the processing unit on the display. Thus, in the terminal unit of the receiving terminal, the mode switching means is operable to switch from the receiving mode to the print administration mode. Accordingly, it is possible to avoid a problem in which receiving mode information and print administration mode information is displayed at the same time on the display.

Other characteristics and advantages of the present invention will be made clear from the below description of an embodiment with reference to the appended drawings.

DESCRIPTION OF THE EMBODIMENTS

Figure 1:
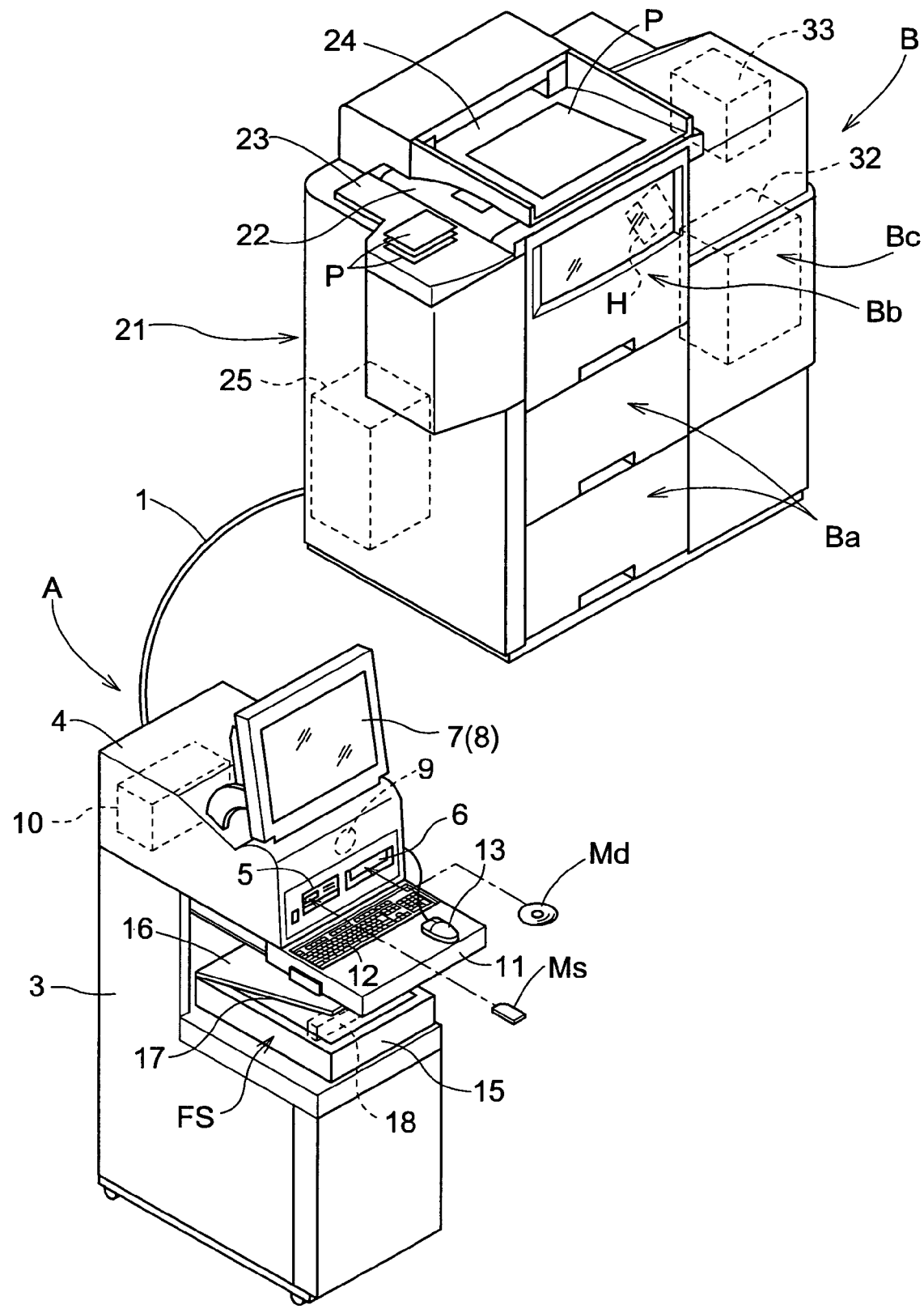
FIG. 1 is a perspective view of a printing system.

Hereinafter, an embodiment of the present invention will be described with reference to the drawings.
Overall Configuration FIG. 1 shows an ink jet printing system comprising a receiving terminal A for performing acquisition of image data, acquisition of order data and necessary correction processing, and a printing portion B for forming a shot image on a print paper P used as a print medium based on the image data transmitted from the receiving terminal A via a communications cable 1. The core control element of the printing system of the present invention is a processing unit 25 comprising by way of example, a personal computer and described in detail below.

In accordance with an exemplary embodiment of the present invention, the printing system of the present invention can be installed in a photo lab or convenience store. The receiving terminal A is placed in a position where it can be directly operated by customers, such as a point of sale, and the printing portion B is placed in a position where it can be easily administered by an operator, such as inside a counter. The receiving terminal A can be operated by an operator instead of a customer who is unfamiliar with its operation, or by an operator at a maintenance time.
Receiving Terminal In accordance with an exemplary embodiment of the present invention, the receiving terminal A comprises a receiving portion 4 on top of a wagon-like frame 3, and a flatbed scanner FS in an intermediate position in the vertical direction of the frame 3. A semiconductor drive 5 (one example of a media drive) that reads image data saved on a storage medium Ms configured from flash memory, and a disk drive 6 (one example of a media drive) that reads image data saved on a disk-like storage medium Md such as a CD-R or DVD, are provided in the front face of the receiving portion 4. A liquid crystal display 7 for displaying processing information is disposed on top of the receiving portion 4 and a touch panel 8 used as an information input means is formed on the display face of the liquid crystal display 7. A speaker 9 and a terminal unit 10 are provided inside the case of the receiving portion 4.

The receiving terminal A, further comprises a sliding table 11 in a position below the receiving portion 4, a keyboard 12 and a mouse 13. The keyboard 12 and the mouse 13 that function as an operation input means are placed on the sliding table 11. The sliding table 11 is stored in a position below the receiving portion 4 when receiving, and is pulled out and used only when necessary, as in the case of maintenance.

Figure 2:
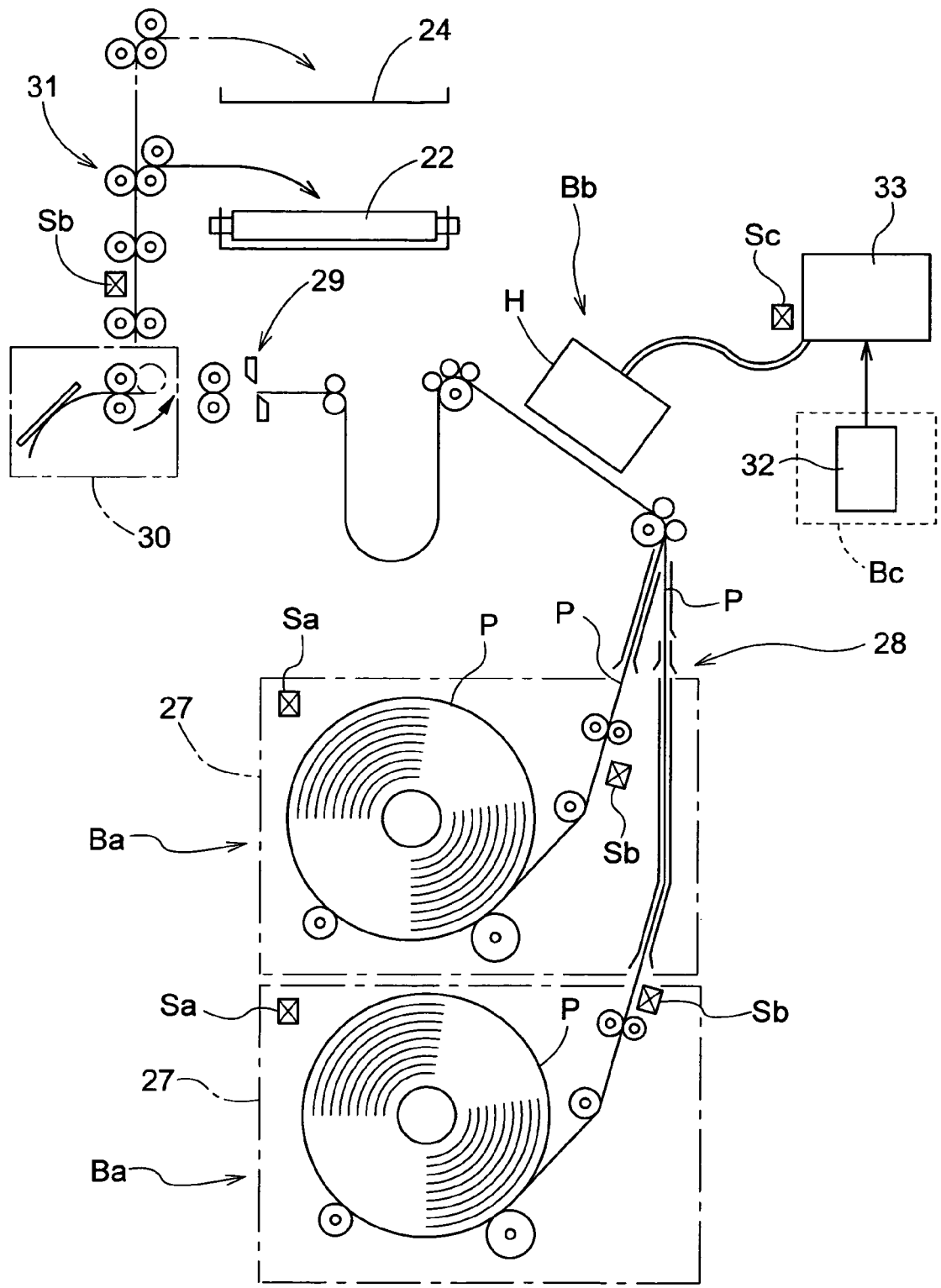
FIG. 2 shows an overview of the paper transport system in a printing portion.

The flatbed scanner FS comprises a main body 15 and a platen cover 16 supported such that it can open and close relative to the main body 15. The main body 15 comprises a scanning table 17 made of transparent glass and a scanning bed 18 disposed on the underside of the scanning table 17. The scanning bed 18 comprises a plurality of photoelectric transducers such as a CCD and a light source in the primary scanning direction. By operating in a secondary scanning direction perpendicular to the primary scanning direction, an image of a scanning target placed on the scanning table 17 can be captured as image data in which the three primary colors R (red), G (green), and B (blue) are separated.
Printing portion In accordance with an exemplary embodiment of the present invention, the printing portion B, as shown in FIGS. 1 and 2, comprises two magazine storage portions Ba disposed in the lower portion of a case 21, a print engine Bb for printing image data on the print paper P disposed in the upper portion of the case 21, and an ink storage portion Bc disposed in the side of the case 21. A sorting portion 23 for feeing out print paper P with a comparatively small size via a cross-feed belt 22 and a rack plate 24 for handling large-size print paper P are provided on the top face of the case 21. Also, a processing unit 25 for receiving operating input information from the terminal unit 10 via the communications cable 1 is provided inside the case 21.

When print processing is performed with the printing portion B, from a plurality of paper magazines 27 stored in the magazine storage portions Ba, print paper P with a width matched to the print size is transported upward with a supply transport unit 28 and fed into the printing portion Bb. The image data is printed on the print paper P by operating an inkjet print head H, provided in the printing portion Bb, back and forth in the primary scanning direction. After printing, the print paper P is cut to the print size with a cutter unit 29, its front and back are reversed with a reversal unit 30, and the print paper P is fed out to either the cross-feed belt 22 or the rack plate 24 from a discharge transport unit 31.

Although not shown, an actuator such as a stepping motor is provided in the supply transport unit 28, the cutter unit 29, the reversal unit 30, and the discharge transport unit 31, respectively, and a guide or the like that guides the paper is provided.

The ink storage portion Bc comprises a plurality of ink cartridges 32 provided such that they can be exchanged and an ink supply system that supplies ink from the ink cartridges 32 to the print head H via a sub-tank 33. Also, a paper remaining amount sensor Sa that detects when the paper P is equal to or below a set value is provided in the magazine storage portion Ba, a plurality of jam sensors Sb are provided in the transport system from the supply transport unit 28 to the discharge transport unit 31, and an ink remaining amount sensor Sc that determines a reduction in the remaining amount of ink is provided in the sub-tank 33.

Among the plurality of ink cartridges 32, cartridges corresponding to black (K), light black (LK), cyan (C), magneta (M), light cyan (LC), light magneta (LM), and yellow (Y) ink are provided.

Control System

Figure 3:
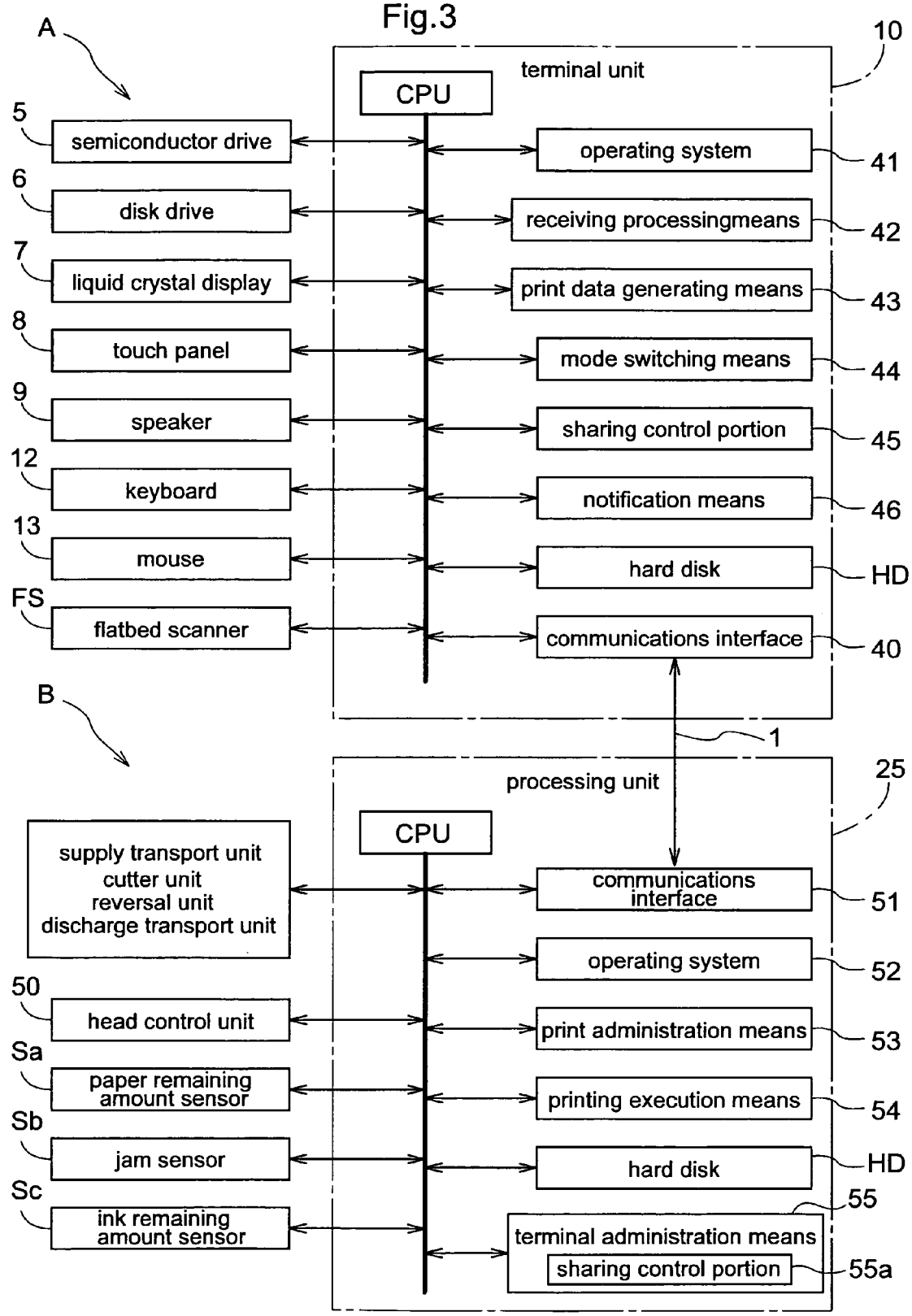
FIG. 3 is a block circuit diagram of the control system in a printing system.
Figure 4:
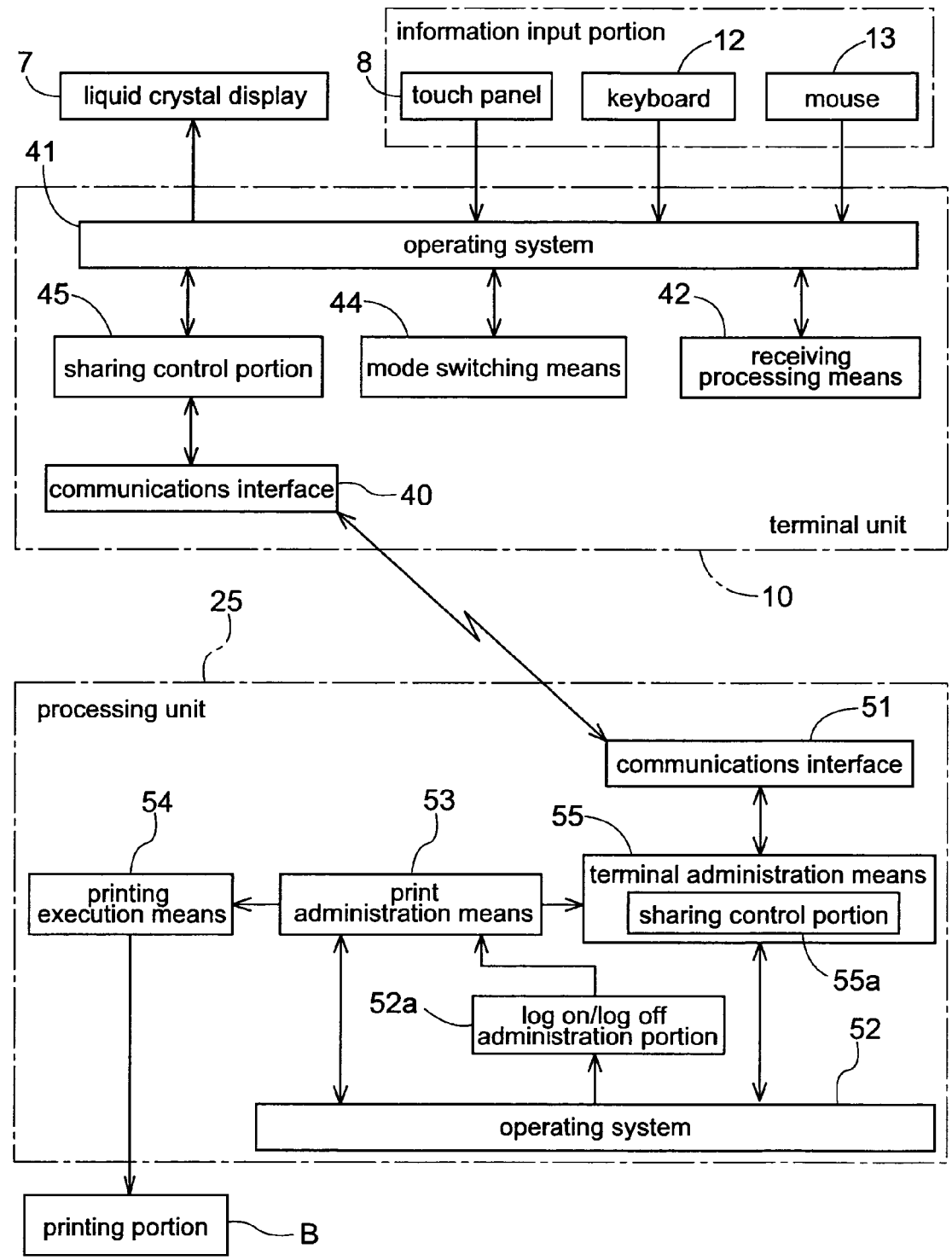
FIG. 4 is a functional block diagram that illustrates a function of a printing system.

An overview of the control system of the printing system of the present invention is shown in FIGS. 3 and 4. The terminal unit 10 used as the core element of control of the receiving terminal A forms an access system for information of the semiconductor drive 5, the disk drive 6, the liquid crystal display 7, the touch panel 8, the keyboard 12, the mouse 13, the speaker 9, and the flatbed scanner FS, respectively, for a microprocessor (CPU). The terminal unit 10 comprises a hard disk HD, a communications interface 40, an operating system 41, a receiving processing means 42, a print data generating means 43, a mode switching means 44, a sharing control portion 45 and a notification means 46.

Although the receiving processing means 42, the print data generating means 43, the mode switching means 44, the sharing control portion 45, and the notification means 46 are respectively constructed with software, they can be configured with logic hardware or the like, or they can be configured by a combination of hardware and software.

In accordance with an exemplary embodiment of the present invention, the printing system for controlling a paper transport system constituted by the supply transport unit 28, the cutter unit 29, the reversal unit 30, the discharge transport unit 31, and an access system for accessing information of a head control unit 50 that controls the print head H, for the microprocessor (CPU). A signal system receives information as input from the paper remaining amount sensor Sa, the jam sensors Sb, and the ink remaining amount sensors Sc. The processing unit 25 comprises a hard disk HD. A communications interface 51, an operating system 52, a log on/log off administration portion 52a, a print administration means 53, a print execution means 54, and a terminal administration means 55. The terminal administration means 55 performs information exchange via bi-directional communication with the receiving terminal A. In order to simplify the exchange of information between the terminal administration means 55 and the receiving terminal A, the terminal administration means 55 comprises a sharing control portion 45 that interacts with the sharing control portion 45 of the receiving terminal A. The log on/log off administration portion 52a, via interaction with the operating system 52 authenticates a log on state that permits operation from an input terminal by the operator logging on when booting the input terminal, and authenticate a logged off state or a boot state prior to logging on as a non-logged on state. In a non-logged on state, in which log on is not established, the print administration means 53 can directly administer the printing portion B through the print execution means 54, and the terminal administration means 55 can exchange information with the receiving terminal A.

Also, a communications means is configured by software or the like that realizes communications with the communications interfaces 40 and 51 and the communications cable 1.

Although the print administration means 53, the log on/log off administration portion 52a, the print execution means 54, the terminal administration means 55, and the like are constructed with software, they can be configured with logic hardware or the like, or they can be configured by a combination of hardware and software.

In the printing system of the present invention, with the receiving terminal A and the printing portion B in a state of operation, printing is executed by transmitting image data received with the receiving terminal A to the printing portion B via an information transmission system configured with the communications interfaces 40 and 51 and the communications cable 1.

In accordance with an embodiment of the present invention, when the receiving terminal A is operated, a print receiving screen (not shown) is displayed on the liquid crystal display 7. The receiving screen is displayed by the processing of the receiving processing means 42, and along with this display, for example, by setting the storage medium Ms configured from flash memory in the semiconductor drive 5. Operating the touch panel 8 according to sequentially displayed screens, the image data stored on the storage medium Ms can be displayed in thumbnail format on a screen, data to be printed can be designated from among the displayed image data, the print size, number of prints, and the like (order data) can be designated. The receiving processing means 42 acquires the image data and order data designated in this manner and saved on the hard disk HD.

Next, the print data generating means 43 generates print data suitable for printing, and transmits that print data along with the order data to the processing unit 25. In the processing unit 25, after the transmitted data is saved on the hard disk HD, the print execution means 54 prints image data on the print paper P by controlling the paper transport system and the head control unit 50. The print administration means 53 acquires information from the paper remaining amount sensor Sa, the jam sensors Sb, and the ink remaining amount sensor Sc, while the print execution means S4 executes printing. When a paper jam is detected in the transport system that information is transmitted to the terminal unit 10. The notification means 46 causes the speaker 9 to generate a warning sound and displays information regarding the jam location on the liquid crystal display 7.

Figure 5:
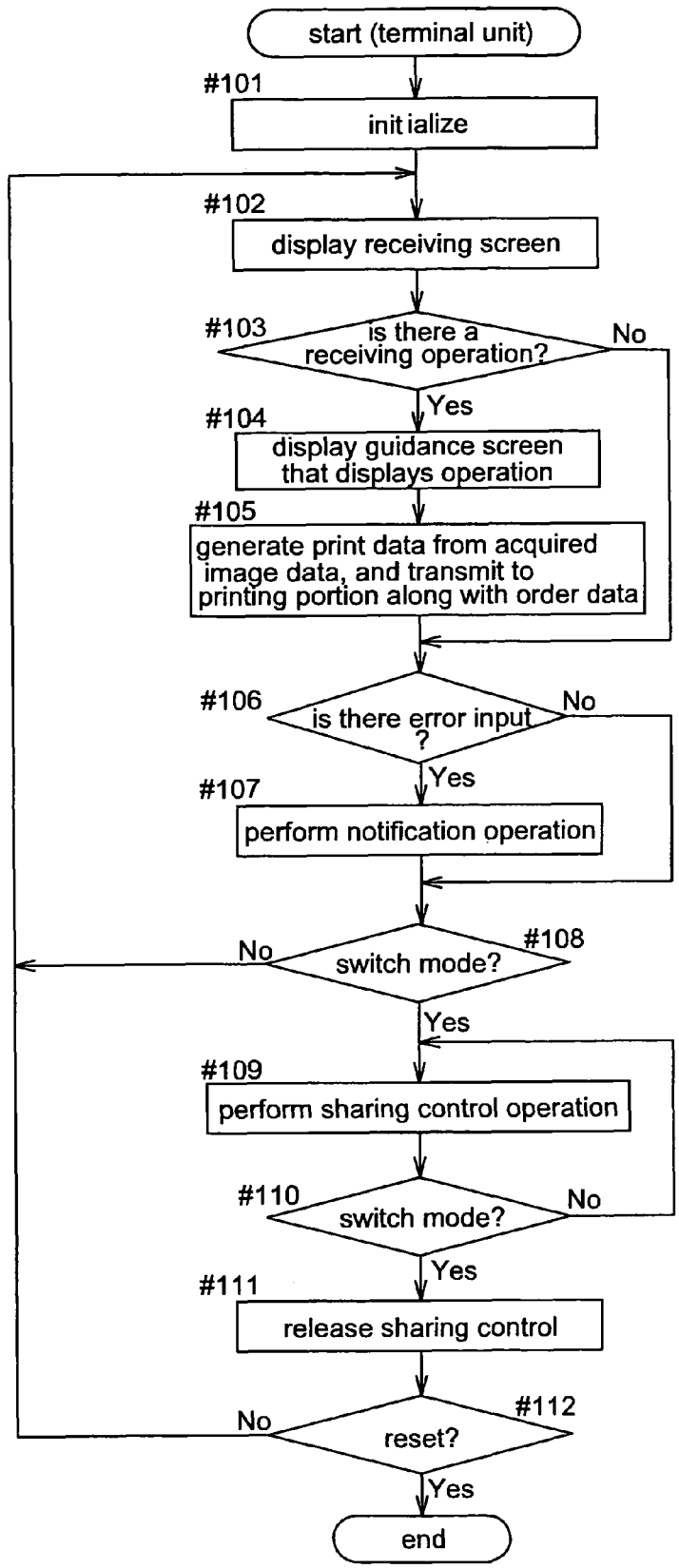
FIG. 5 is a flowchart that shows the form of control of a terminal unit.

The flowchart in FIG. 5 shows an overview of processing when the terminal unit 10 is in operation. That is, when the terminal unit 10 is booted (when operated ON), a receiving screen (not shown) is displayed on the liquid crystal display 7 after performing initialization in steps 101 and 102.

In a state in which the receiving screen is displayed in this manner, by a customer (including an operator) performing a receiving operation, a guidance screen is displayed on the liquid crystal display 7, that shows the operation that the customer should perform. The image data to be printed is acquired when the customer sets the image data to be printed via the touch panel 8 and sets the print size and the number of prints in accordance with the display. The order data, such as the print size and number of prints, is also acquired and temporarily saved on the hard disk HD of the receiving terminal A by the receiving processing means 42) in steps 102-105.

The screen displayed on the liquid crystal display 7 when receiving is basically unchanged from JP 2003-78847A, which is incorporated by reference in its entirety.

Next, the print data generating means 43 generates the print data corresponding to the print size from the acquired image data and transmits along with the order data to the printing portion B in step 105. It is not always necessary to perform this processing with the print data generating means 43 in the receiving terminal A; it can be performed with the processing unit 25 of the printing portion B. In this case, it is effective to send compressed image data such as image data saved in the JPEG format (a format established by the Joint Photographic Experts Group) from the receiving terminal A to the printing portion B.

Next, as in the case when a paper jam was detected by the jam sensors Sb, when an input error from the printing portion B is detected in step 106, a warning sound is generated from the speaker 9. At the same time, the notification means 46 displays a message notifying that a jam has occurred on the liquid crystal display 7 and the position of the jam in step 107.

Next, in a state in which the receiving screen is displayed, the mode switching means 44 is operable to perform mode switching by operating a specific part of the liquid crystal display 7, or by pulling out the keyboard 12 and operating a specific key in step 108.

This mode indicates a receiving mode in which the receiving processing means 42 displays a receiving screen on the liquid crystal display 7 and receives print processing, and a print administration mode that displays information based on the processing of the processing unit 25 on the liquid crystal display 7.

When the mode has been switched, the sharing control portion 45 sharing control performs and this sharing control is continued until it is released by switching the mode in steps 109-111.

When the sharing control processing is performed, by inputting information that has been set in advance from the keyboard 12 and the mouse 13, which function as an operating input terminal in the terminal unit 10, the receiving mode is released, and by selecting the print administration mode it is possible to perform the sharing control processing. At the time of this sharing control, the processing unit 25 acquires operating input information from the keyboard 12 and the mouse 13 which function as an input terminal via the communications cable 1, the processing unit 25 performs processing based on the information from the operating input terminal, and further, by transmitting information of this processing to the terminal unit 10 via the communications cable 1, processing information is displayed on the liquid crystal display 7.

Afterward, when releasing the processing in the print administration mode is released and returned to the receiving mode, same as described above, information that has been set in advance is input from the input terminal of the keyboard 12, mouse 13, and the like. The touch panel 8 can also be used as an input terminal.

The processing with the terminal unit 10 thus described continues until power is turned off or the terminal unit 10 is reset in step 112.

Figure 6:
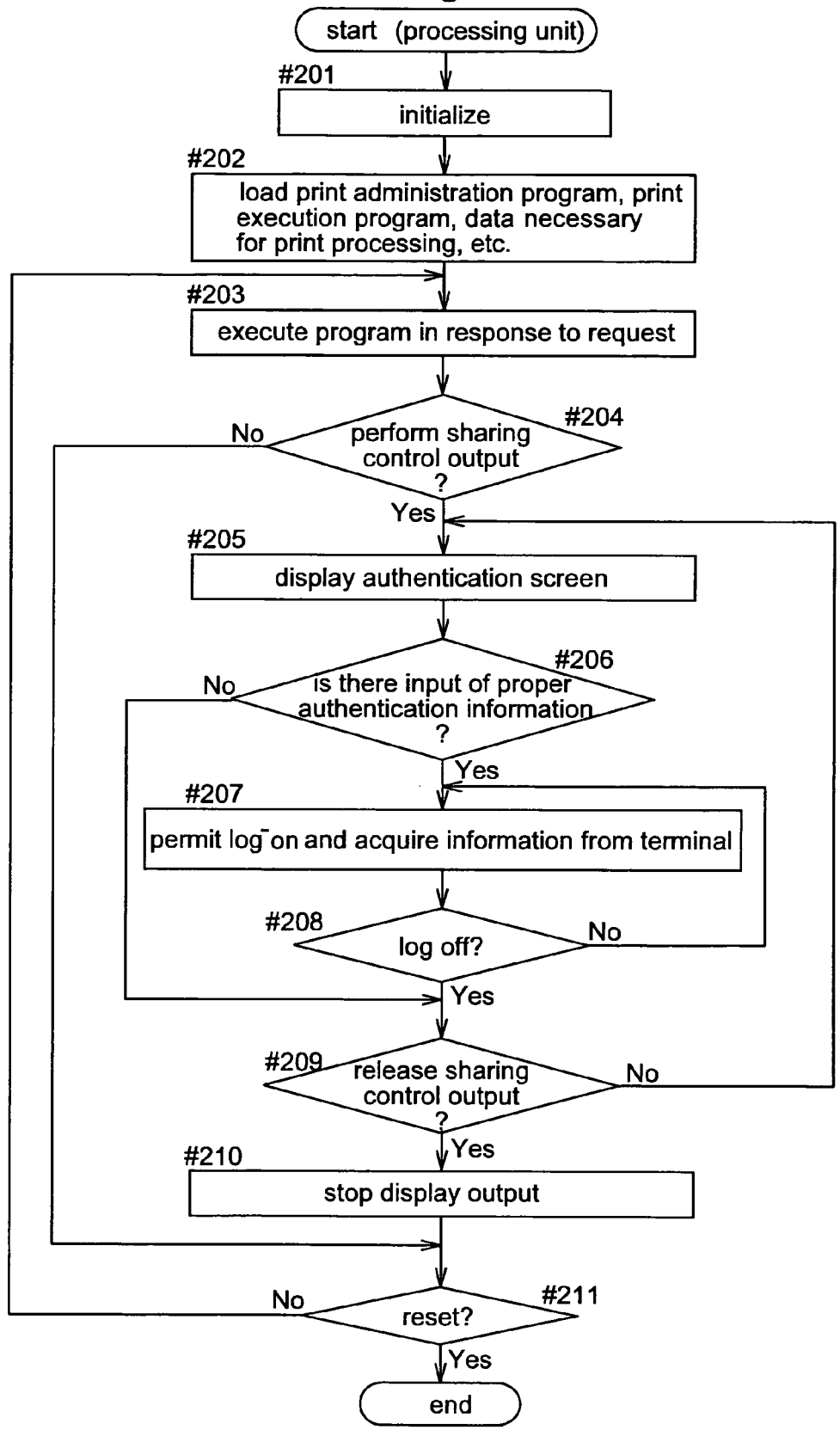
FIG. 6 is a flowchart that shows the form of control of a processing unit.

The flowchart in FIG. 6 shows an overview of processing when the processing unit 25 is in operation. That is, when the terminal unit 25 is booted (when turned on), after performing initialization, a print administration program that functions as the print administration means 53, a print execution program that functions as the print execution means 54, and data and the like necessary for print processing are loaded in steps 201 and 202.

By completing this loading process, when the image data and the order data have been transmitted from the terminal unit 10, the print execution program performs print processing and the print administration program administers print processing in step 203.

The print execution program performs print processing based on the image data and order data. During the print processing, when it has been determined from the information of the paper remaining amount sensor Sa that the amount of remaining paper has dropped, when it has been determined from the information of the jam sensors Sb that there is a jam in the transport system, or when it has been determined from the information of the ink remaining amount sensor Sc that the amount of remaining ink has dropped, the print administration program performs notification processing that transmits information corresponding to the respective conditions to the terminal unit 10.

In the terminal unit 10, by inputting authentication information and logging on, a desired input operation that the operator requires can be permitted, and prior to logging on and after logging off, the print execution program executes print processing, and the print administration program can perform administration of print processing.

In this way of administering log on and log off, and execution of part of the processing in the logged off state, is performed by the cooperative work of the operating system 52 and the log on/log off administrative portion 52a. Microsoft Windows NT is representative of the operating system 52, which can administer log on and log off. With Windows NT, by setting a service application, it is possible when booting to execute the service application in a state in which the service application is made resident. By using this feature of Windows NT, the print administration means 53, in cooperation with the log on/log off administration portion 52a, can administer print processing via the print execution means 54 in a logged off state.

Figure 7:
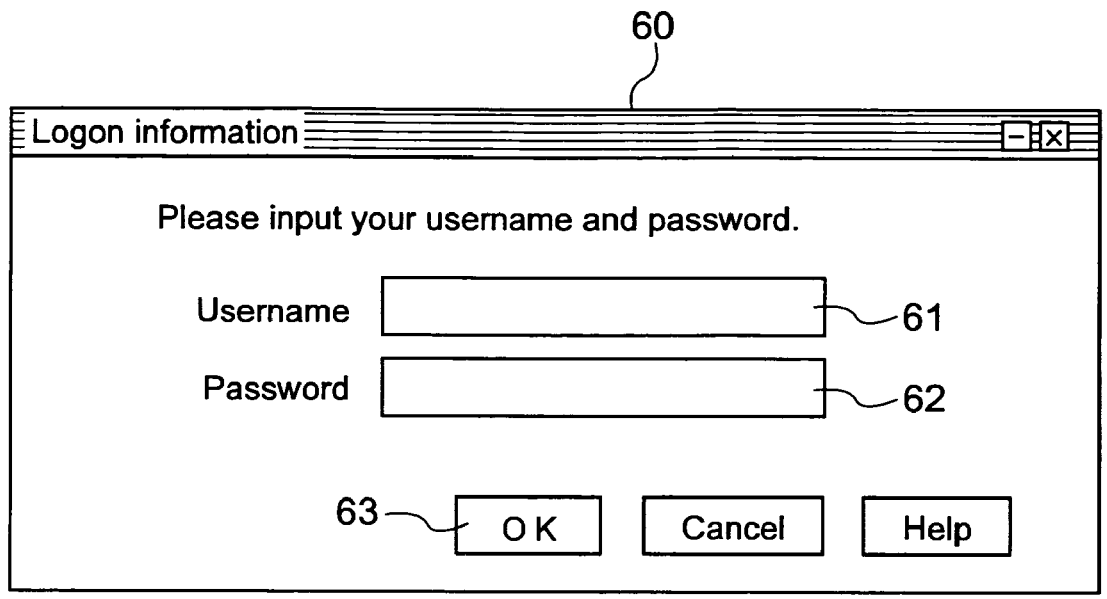
FIG. 7 shows an authentication screen.

Next, when a switch is made in the terminal unit 10 from the receiving mode to the print administration mode and sharing control has been requested in step 204, an authentication screen 60 shown in FIG. 7 is displayed on the liquid crystal display 7 in step 205. A username input portion 61, a password input portion 62, and an OK button portion 63 are formed in the authentication screen 60, and when proper information is input in the username input portion 61 and the password input portion 62 as authentication information in step 206, logging on is permitted in step 207, information is acquired from the input terminal, and corresponding processing is executed in steps 204-208.

As processing performed after logging on, it is conceivable to make settings or changes to a driver or the like necessary for printing, to make settings or changes to data or the like read when booting with the processing unit 25, or alternatively, to install or delete an application or the like.

Figure 8:
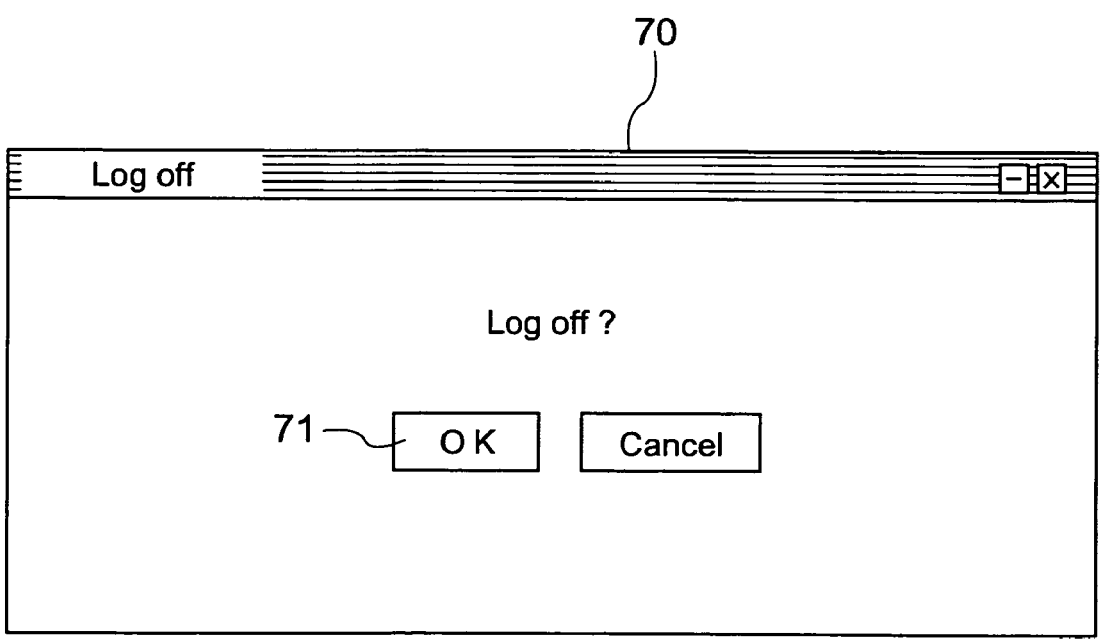
FIG. 8 shows a log off screen.

Afterward, when information that has been set from the keyboard 12 or the mouse 13 has been input, a log off screen 70 shown in FIG. 8 is displayed, log-off is performed by operating an OK button 71 after confirming log-off in step 208, and when sharing control has been released display output is stopped in steps 209-210. Also, when logged off (including before logging in), operation from the keyboard 12 or the mouse 13 is prohibited, and data of the processing unit 25 cannot be changed or deleted.

The processing with the processing unit 25 described above continues until power is turned off or the terminal unit 10 is reset in step 211.

With the printing system in accordance with an embodiment of the present invention, the receiving apparatus A, which is often operated by a customer or an inexperienced operator, for example, even when the mode is switched by an erroneous operation and access to the processing unit 25 has become possible, changes or deletions of a program or data in the processing unit 25 become possible only when proper authentication information is entered. Thereby, changes or deletions of a program or data by a customer or an inexperienced operator can be prevented with the present invention.

The present invention, other than the embodiment above, can also be configured in the following manner.

(a) The print execution means 54 and the print administration means 53 can be configured as a sub-unit that has a microprocessor. The print processing is performed by transmitting data necessary for printing from the processing unit 25 to the sub-unit. When an error has occurred during the print processing, error information is transmitted from the sub-unit to the processing unit 25.

(b) An input terminal such as a keyboard can be directly connected to the processing unit 25, (c) A configuration in which an image is formed by exposing light on a photosensitive material is used as the printing portion B, (d) The receiving terminal A and the printing portion B can be integrated, (e) A configuration is also possible in which, by connecting the processing unit to a communications line of the Internet or the like, image data acquired via the communications line is printed. In such case, an inappropriate operation via the communications line is prevented.

The invention claimed is:

1. A printing system for outputting a photographic print from acquired image data, comprising:
   a printing portion for forming an image on a printing medium based on the image data, and
   a processing unit provided in the printing portion for administering photographic print output processing, comprising
      a log on/log off administration portion for permitting log-on of an operator from an input terminal based on authentication information obtained from the input terminal and permitting operation from the input terminal by the operator in a state in which log-on has been established,
      a print execution module for controlling the printing portion to execute print processing based on print data and order data even when the processing unit is logged-off state, and
      a print administration module for not permitting input from the input terminal and obtaining the state of the printing portion in the print processing in a state in which log-on has not been established by the log on/log off administration portion and for informing the input terminal, when the obtained state is abnormal.

2. The printing system of claim 1, wherein the processing unit, by loading a plurality of programs comprising an administration program when booting, executes a processing set in advance before logging on and when logged off and at the same time prohibits the operation of the input terminal, and wherein the administration program performs notification processing to notify a problem in the print processing when the administration program determines that there was a print processing problem with the printing portion.

3. The printing system according to claim 1, further comprising a receiving terminal comprising
   a media drive for acquiring image data from the storage medium;
   a display for displaying processing information;
   an information input module for acquiring operating information from an operator, and
   a terminal unit for controlling the media drive, the display, and the information input module; and
   a sharing control portion for displaying information from the processing unit on the display, and transmitting infoiination from the receiving terminal to the processing unit; and
   wherein the terminal unit of the receiving terminal and the processing unit are connected via a communications means.

4. The printing system of claim 3, wherein the terminal unit comprises:
   a receiving processing module for displaying a guidance screen on the display, and acquiring image data from the storage medium via the media drive and acquiring order data for print processing by operating the information input module according to this guidance screen; and
   a mode switching module for performing switching between a receiving mode in which information based on the processing of the receiving processing module is displayed on the display and a print administration mode that displays information based on the processing of the processing unit on the display.

5. A printing system for outputting a photographic print from acquired image data, comprising:
   a printing portion for forming an image on a printing medium based on the image data, and
   a processing unit provided in the printing portion for administering photographic print output processing, comprising
      an operating system;
      a log on/log off administration portion for permitting log-on of an operator from an input terminal based on authentication information obtained from the input terminal and permitting operation from the input terminal by the-operator in a state in which log-on has been established when booting the operating system;
      a print execution module for controlling the printing portion to execute print processing based on print data and order data even when the processing unit is logged-off state, and
      a print administration module for not permitting input from the input terminal and obtaining the state of the printing portion in the print processing in a state in which log-on has not been established by the log on/log off administration portion and for informing the input terminal, when the obtained state is abnormal.

6. The printing system of claim 5, wherein the print administration module executes a processing function that has been set in advance when log-on has not been established by the log on/log off administration portion, and notifies that there is a problem in the print processing through the processing function, when the present administration module determines that there is a problem with the print processing in the printing portion.

7. The printing system according to claim 5, further comprising
   a receiving terminal comprising
      a media drive for acquiring image data from the storage medium;
      a display for displaying processing information;
      an information input module for acquiring operating information from an operator; and
      a terminal unit for controlling the media drive, the display, and the information input module; and further comprising a sharing control portion for displaying information from the processing unit on the display, and transmitting information from the receiving terminal to the processing unit; and
      wherein the terminal unit of the receiving terminal and the processing unit are connected via a communications means.

8. The printing system of claim 7, wherein the terminal unit comprises:
- a receiving processing module for displaying a guidance screen on the display, and acquiring image data from the storage medium via the media drive and acquiring order data for print processing by operating the information input module according to this guidance screen; and
- a mode switching module for performing switching between a receiving mode in which information based on the processing of the receiving processing module is displayed on the display and a print administration mode that displays information based on the processing of the processing unit on the display.

* * * * *